Patented Dec. 6, 1938

2,139,277

UNITED STATES PATENT OFFICE 2,139,277

DIALKYL CYCLOHEXYLAMINE SALTS OF HIGHER ALKYL SULPHATES

Samuel Lenher and Luther B. Arnold, Jr., Wilmington, Del., assignors to E. I. du Pont de Nemours & Company, Wilmington, Del., a corporation of Delaware No Drawing. Application February 23, 1938, Serial No. 192,160

8 Claims. (Cl. 260—459)

This invention relates to new amine salts of sulphuric acid esters of aliphatic monohydric alcohols of high molecular weight. More particularly it relates to dialkyl cyclohexylamine salts of sulphuric acid esters of aliphatic normal monohydric alcohols containing from 8 to 20 and preferably 10 to 18 carbon atoms in the aliphatic chain. The invention also relates to novel methods of preparing such compounds.

This invention has for an object the preparation of a new class of compounds. A further object is the preparation of a new class of compounds which have surface active properties in aqueous solutions. A still further object is the preparation of a new class of surface active compounds which are soluble in oil. A still further object is to obtain a class of substances which are suitable for softening textile fabrics. Other objects will appear hereinafter.

The above and other objects are accomplished by the following invention wherein amine salts of sulphuric acid esters of aliphatic monohydric alcohols of high molecular weight are produced. The salts have the following general formula:

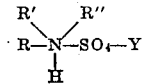

wherein R is a cyclohexyl radical, R' and R'' are alkyl groups containing not more than three carbon atoms and preferably less than three, e. g. methyl and ethyl, and Y is the radical of a normal primary aliphatic alcohol having 8 to 20 and preferably 10 to 18 carbon atoms.

The invention will be further illustrated but is not intended to be limited by the following examples:

Example I

Coconut oil is subjected to catalytic hydrogenation or sodium reduction to produce higher fatty alcohols. The resulting mixture of alcohols is fractionated to separate therefrom the lower 20% and the residual 20%, leaving the middle 60% fraction. This fraction is composed primarily of dodecyl alcohol but also contains small amounts of decyl, tetradecyl, octadecyl and hexadecyl alcohols.

To 300 parts of the mixture of alcohols, obtained from the aforementioned middle fraction, 160 parts of chlorsulphonic acid are added during stirring at such a rate that the temperature is maintained between 35 and 40° C. After addition of the chlorsulphonic acid the product is stirred for 5-10 minutes and then added to 250 parts of diethyl cyclohexylamine at such a rate that the temperature is kept below 75° C. The mass is then stirred until it is uniform, resulting in the production of a product which is composed mainly of diethyl cyclohexylamine dodecyl sulphate.

Example II

Seventy-three grams of dodecyl alcohol containing small amounts of decyl, myristyl and cetyl alcohols are sulphated with 39 grams of chlorsulphonic acid (90% of theory) at 35-40° C. The mass is neutralized by pouring it into 50 grams of dimethyl cyclohexylamine during external cooling in an ice bath. The product is a light brown liquid which becomes solidified at room temperature.

Example III

Three hundred grams of hexadecyl alcohol are sulphated at 55-60° C. over a period of 1½ hours with 144 grams of chlorsulphonic acid. The mass is then poured into 218 grams of diethyl cyclohexylamine. On cooling to room temperature the product becomes a reddish brown, semicrystalline wax. Ethyl methyl cyclohexylamine may be substituted for the specific amine of this example with equally good results. Di-isopropyl-cyclohexylamine may be substituted in a similar manner.

In place of the alcohols of the preceding examples other pure or technical alcohols or mixtures may be substituted. The alcohols are preferably normal straight-chain primary alcohols which may be either saturated or unsaturated. Thus, octyl, decyl, palmitoleyl, oleyl, ricinoleyl, and linoleyl alcohols or any mixtures of the same may be substituted for those of the examples. The hydrocarbon chains may be further substituted by hydrocarbon groups. Although normal alcohols are preferred, secondary, and tertiary alcohols may also be used effectively in the preceding examples.

This application is a continuation-in-part of our application, Serial No. 743,720, filed September 12, 1934.

The compounds and products of this invention are very satisfactory for use in those connections where a surface active material is desired. For example, they may be used alone or in combination with other suitable detergents for cleansing and scouring vegetable and animal fibers when removing fatty or oily materials. They may be used as penetrants in acid solutions which are used for carbonizing vegetable matter in wool. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, weighting salts such as magnesium sulphate or calcium chloride, oils and oils processed by oxidation, polymerization, sulphonation, etc. The penetrating power of these new compositions is utilized with advantage when they are added to baths containing starch ferments which are employed for removing sizing from textile materials. These products function as useful wetting, cleansing, and penetrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, preshrinking, impregnating, waterproofing, and mildew-proofing. They may be used alone or in combination with other materials for lustering or delustering fabrics. They may be employed to oil or lubricate textile materials and as assistants in processes of weighting or loading fabrics. They may be used as assistants in silk degumming liquors and silk soaking solutions. They can also be used to assist in twist setting in yarn and in processes of stripping colors. These compounds may be used as assistants in processes of stripping dyes from dyed textile materials.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulphur dyes in a finely divided condition. As penetrants and wetting agents they assist in producing level dyeings in neutral, acid or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber. Solutions of these compounds are useful for increasing the fastness of dyeings on textile materials. Solutions of these compounds may be used for increasing the affinity of textile fibers of vegetable origin for acid-chrom dyestuffs. These compounds may be used as assistants in resist printing processes.

In the leather industry these compositions function as useful wetting agents in soaking, deliming, bating, tanning, and dyeing baths. They are useful in softening and treating baths for hides and skins, particularly in baths used for fat-liquoring leather and in processes of water-proofing leather. Solutions of these compounds are useful for pretreating leather prior to dyeing.

The dispersing and emulsifying powers of these new compositions give rise to many interesting uses. They may be utilized for converting liquid or solid substances normally insoluble in water, such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized or reclaimed rubber. They may be used as emulsifiers in the manufacture of cosmetic preparations such as cold creams and lip sticks. They may be employed for preparing emulsions of the water-in-oil type such as emulsions of water in such organic solvents as are used in the dry cleaning industry. They are also of value in the breaking of petroleum emulsions, such as those naturally occurring in nature or produced during the refining of petroleum.

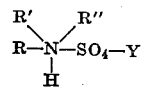

These compositions may also be used alone as bactericides and contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, acid, or alkaline liquors. They may be used for paints, varnish, and lacquer cleaners. They may advantageously be employed as cleansing agents in hard water and where a fatty or oily film resists the ordinary cleansing media. They may be added to soap in acid or hard water baths, since these compositions do not form precipitates so readily in hard and acid waters as soaps and Turkey red oils.

These compositions may be used as aids in various chemical reactions. They may be used to control particle size and shape during precipitation or crystallization of compounds from reaction mixtures. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used to stabilize rubber latex. They may also be used as frothing and collecting agents in ore flotation processes, and in other processes such as the recovery of fixed oil from the oil sands. The uses mentioned will suggest many similar ones.

By means of the present invention a large class of new and commercially feasible surface active materials has been rendered available for use. These compounds possess satisfactory colloidal properties and are of particular value for use in place of or in combination with soap and soap substitutes. This invention is of considerable interest in that the reactants which enter into it are for the most part readily available at a relatively low cost.

As many apparently widely different embodiments of this invention may be made without departing from the spirit and scope thereof, it is to be understood that the invention is not limited to the specific embodiments thereof except as defined in the appended claims.

We claim:

1. Chemical compounds having the following general formula:

$$R-\underset{H}{\overset{R'\diagup\diagdown R''}{N}}-SO_4-Y$$

wherein R is a cyclohexyl radical, R' and R" are alkyl groups containing not more than three carbon atoms, and Y is a normal primary aliphatic hydrocarbon radical having 8 to 20 carbon atoms.

2. Chemical compounds having the following general formula:

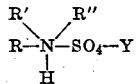

wherein R is a cyclohexyl radical, R' and R" are alkyl groups containing less than three carbon atoms, and Y is a normal primary aliphatic hydrocarbon radical having 8 to 20 carbon atoms.

3. Chemical compounds having the following general formula:

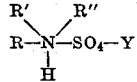

wherein R is a cyclohexyl radical, R' and R" are alkyl groups containing less than three carbon atoms, and Y is a normal primary aliphatic hydrocarbon radical having 10 to 18 carbon atoms.

4. Chemical compounds having the following general formula:

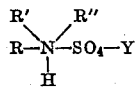

wherein R is a cyclohexyl radical, R' and R" are alkyl groups containing less than three carbon atoms and Y is an alkyl radical having 10 to 18 carbon atoms.

5. Diethyl cyclohexylamine dodecyl sulphate.

6. Dimethyl cyclohexylamine hexadecyl sulphate.

7. The process which comprises sulphating an aliphatic alcohol having at least eight carbon atoms and neutralizing the resulting product with a dialkyl-cyclohexylamine in which the alkyl groups contain not more than three carbon atoms.

8. The process which comprises neutralizing a sulphuric acid ester of a normal straight chain primary aliphatic alcohol containing 8 to 20 carbon atoms with a dialkyl-cyclohexylamine in which the alkyl groups contain less than three carbon atoms.

SAMUEL LENHER.
LUTHER B. ARNOLD, Jr.